(12) United States Patent
McCully

(10) Patent No.: US 12,373,572 B1
(45) Date of Patent: Jul. 29, 2025

(54) SYSTEM AND METHOD FOR A USER ACTIVATED PENETRATION TEST

(71) Applicant: Bruce McCully, Nashville, TN (US)

(72) Inventor: Bruce McCully, Nashville, TN (US)

(*) Notice: Subject to any disclaimer, the term of this patent is extended or adjusted under 35 U.S.C. 154(b) by 346 days.

(21) Appl. No.: 17/967,855

(22) Filed: Oct. 17, 2022

Related U.S. Application Data

(60) Provisional application No. 63/256,528, filed on Oct. 15, 2021.

(51) Int. Cl.
*G06F 21/57* (2013.01)
*G06N 5/04* (2023.01)

(52) U.S. Cl.
CPC .......... *G06F 21/577* (2013.01); *G06N 5/04* (2013.01); *G06F 2221/033* (2013.01)

(58) Field of Classification Search
CPC .... G06F 21/577; G06F 2221/033; G06N 5/04
See application file for complete search history.

(56) References Cited

U.S. PATENT DOCUMENTS

| | | | | |
|---|---|---|---|---|
| 9,076,013 | B1* | 7/2015 | Bailey, Jr. | G06F 21/577 |
| 10,218,735 | B2* | 2/2019 | Strom | G06F 30/20 |
| 10,540,493 | B1* | 1/2020 | Kras | G06F 21/577 |
| 10,691,796 | B1* | 6/2020 | Stolte | G06F 21/577 |
| 11,720,686 | B1* | 8/2023 | Cross | G06F 9/451 726/25 |
| 11,777,992 | B1* | 10/2023 | Cross | H04L 63/0876 726/5 |
| 12,148,528 | B1* | 11/2024 | Park | G16H 40/67 |
| 2008/0047016 | A1* | 2/2008 | Spoonamore | G06F 21/577 726/25 |
| 2009/0254572 | A1* | 10/2009 | Redlich | G06Q 10/10 |
| 2012/0255022 | A1* | 10/2012 | Ocepek | G06F 21/552 726/25 |
| 2016/0285904 | A1* | 9/2016 | Ye | H04L 63/1425 |
| 2017/0304707 | A1* | 10/2017 | Morton | A63B 71/0622 |
| 2018/0219904 | A1* | 8/2018 | Gorodissky | H04L 63/20 |
| 2020/0226298 | A1* | 7/2020 | Appleboum | G06F 21/577 |
| 2021/0194924 | A1* | 6/2021 | Heinemeyer | G06N 5/04 |
| 2022/0198002 | A1* | 6/2022 | Caciulescu | G06F 21/604 |

* cited by examiner

*Primary Examiner* — Richard G Keehn

(57) ABSTRACT

A system (100) and method (900) enabling a user (80) to initiate a penetration request (300) on an assessed computer (220). The penetration application (310) is communicated from a host computer (210) to the assessed computer (220) on a network (230). The penetration application (310) can be used to create vulnerability data (500) relating to the assessed computer (220). Different embodiments of the system (100) can involve a variety of different operating modes (110).

19 Claims, 25 Drawing Sheets

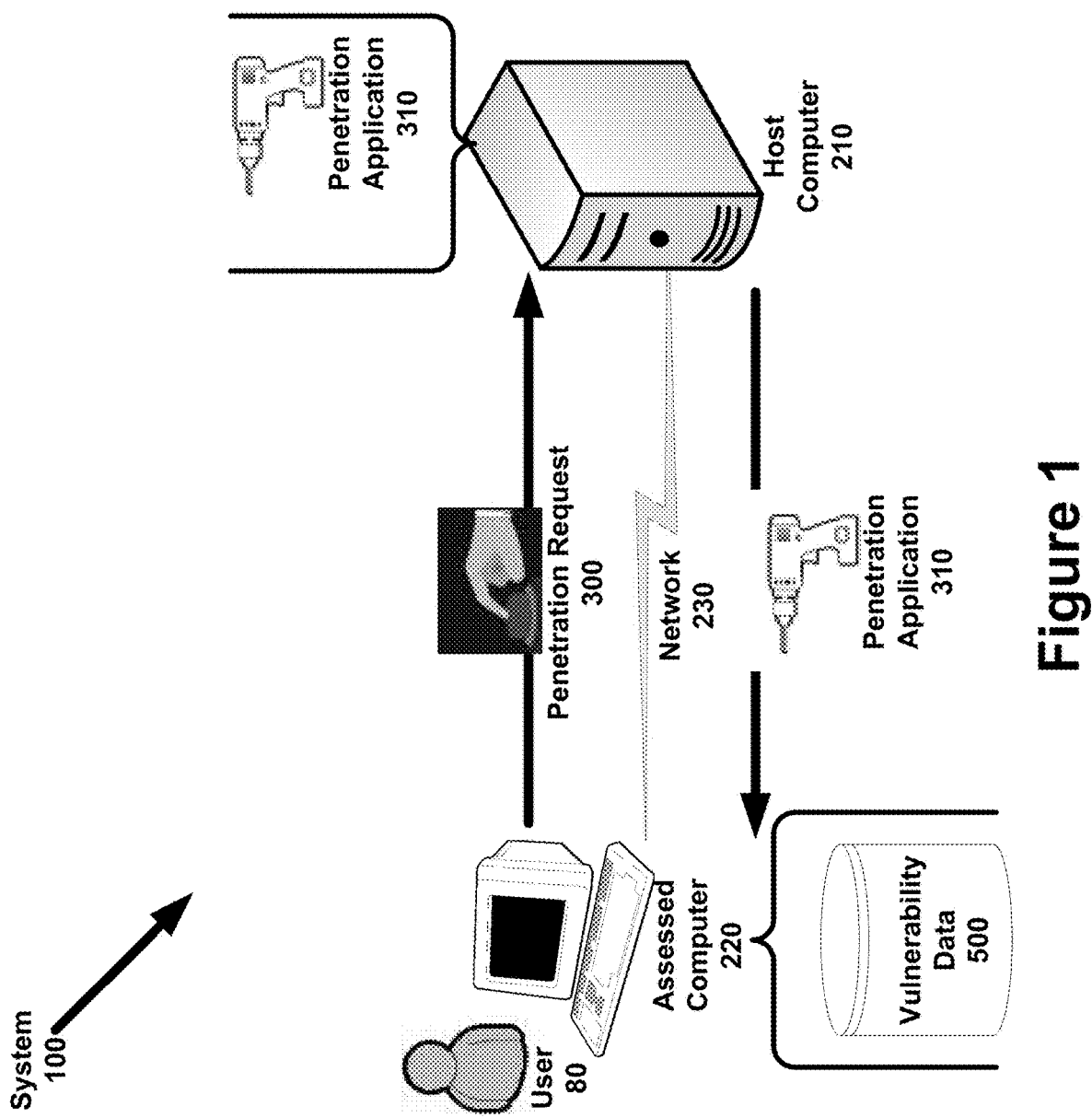

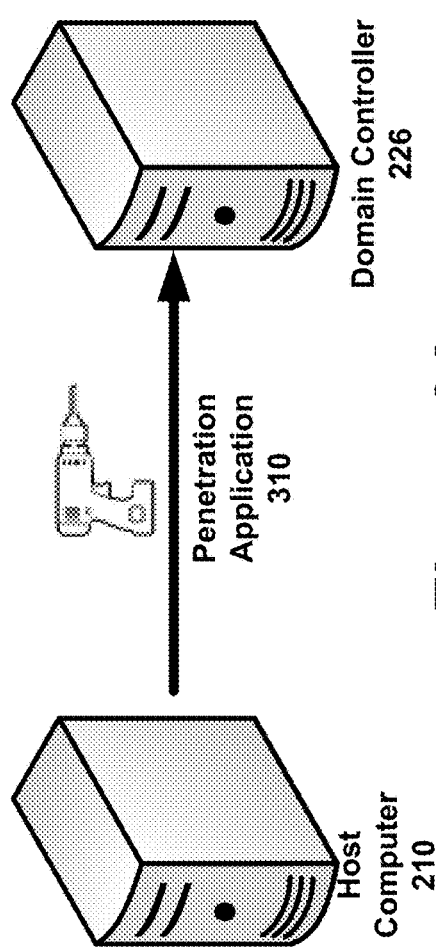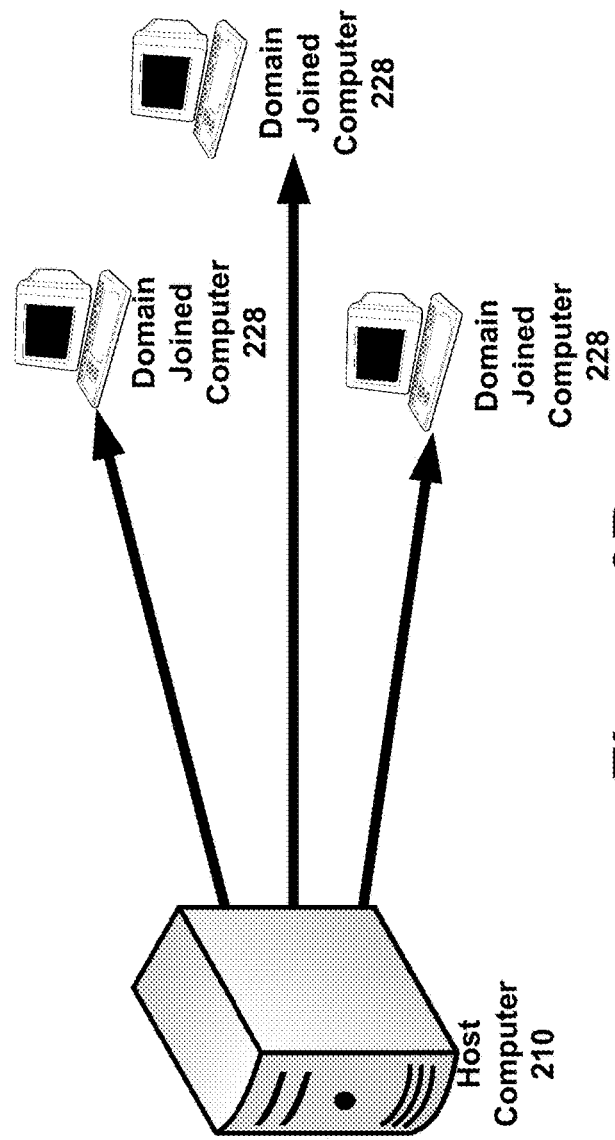
Figure 3A
Figure 3B

METHODS

Category: Methods
Computers Evaluated

Description: The following computers were analyzed in this report. The analysis included a local evaluation of the computer, its user's cyber hygiene, and in some cases, the network around the device. The following list includes the computer name, username, date and time data was collected for this analysis.

| Computer Name | Username | Scan Product | Scan Date |
|---|---|---|---|
| AC#1 | Joe Q. User | Scan_Warpspeed_3F19-4349-A789 | Aug 13, 2021 6:27 PM |
| AC#1 | Joe Q. User | Scan_Mothership_3F19-4349-A789 | Aug 13, 2021 6:33 PM |

Category: Methods
Hard Drive Details

Description: The following details hard drive information for each hard drive evaluated on the network.

| Computer Name | Username | Drive Name | Size | Space Used | Available Space | Percent Used |
|---|---|---|---|---|---|---|
| AC#1 | Joe Q. User | C:\ | 237.00 GB | 131 GB | 106.00 GB | 55.27 |
| AC#1 | Joe Q. User | D:\ | 931.00 GB | 485 GB | 446.00 GB | 52.09 |
| AC#1 | Joe Q. User | C:\ | 237.00 GB | 131 GB | 106.00 GB | 55.27 |
| AC#1 | Joe Q. User | D:\ | 931.00 GB | 485 GB | 446.00 GB | 52.09 |

Category: Methods
External IP Scan

Description: Data recovered from External IP scan.

| Port | Module | IP | Data |
|---|---|---|---|
| n/a | n/a | 12.34.567.8 | No information available for that IP. |

Figure 5A

| | |
|---|---|
| 2 | Microsoft Visual C++ 2019 X64 Minimum Runtime - 14.25.28508 |
| 2 | HP Officejet Pro 8600 Help |
| 2 | Intel(R) Computing Improvement Program |
| 2 | Bonjour |
| 2 | Documentation Manager |
| 2 | Teams Machine-Wide Installer |
| 2 | HP Officejet Pro 8600 Basic Device Software |
| 2 | 64 Bit HP CIO Components Installer |
| 2 | Bing Bar |
| 2 | Microsoft Visual C++ 2015 x86 Additional Runtime - 14.0.24215 |
| 2 | HP Officejet Pro 8600 Product Improvement Study |
| 2 | H&R Block Michigan 2020 |
| 2 | Intel Driver && Support Assistant |
| 2 | I.R.I.S. OCR |
| 2 | HP Update |

Figure 5D

ACCOUNTS

Category: Accounts

Active Users Without Expiring Passwords

Description: Attackers exploit leaked passwords to gain network access. Stale passwords jeopardize the network to breaches and attacks, and are completely preventable through an enforced password change policy.

Remediation: Enforce a password policy for all organization-related accounts. Monitor for non-compliance and remediate user password hygiene when necessary.

- Username
- Administrator
- Guest
- GuestUser

Category: Accounts

Admin User Password Does Not Expire

Description: Administrative user accounts have unrestricted access to critical infrastructure on the network. Hackers aggressively hunt for administrative credentials as a means to access your network. Stale administrator passwords open organization-wide risk to data breaches and attacks.

Remediation: Create a policy in Active Directory to force Administrative users to change their passwords periodically. Also consider enforcing password complexity, length and reuse rules. Also, create guidelines when use of an Administrative account is acceptable.

Figure 6A

Administrator: Administrators

Category: Accounts
Cracked Passwords Found

Description: Passwords were cracked within the environment. Attackers use tools like memory abuse and ripping to obtain access to passwords stored in memory or caches.

Remediation: Communicate to users to never store passwords inside browser memory. Consider additional training around password complexity and management.

| Computer Name | Browser | Login Name | Password | URL |
|---|---|---|---|---|
| AC#1 | Firefox | rxVisitor | xxxx---- | https://www.newlook.dteenergy.com |
| AC#1 | Firefox | (123) 456-7890 | xxx---- | https://www.life360.com |
| AC#1 | Chrome | (123) 456-7890 | xxx---- | https://www.life360.com/circles/ |

Figure 6B

| AC#1 | Chrome | (323) 987-6543 | xxxx----- | https://service.ringcentral.com/login/ma... |
| AC#1 | Chrome | (empty) | xxxx----- | https://www.alignable.com/biz_users/sign... |
| AC#1 | Chrome | (empty) | xxx----- | https://idm.xfinity.com/myaccount/reset |
| AC#1 | Chrome | (empty) | xxxx----- | https://sa.www4.irs.gov/eauth/eauthContr... |
| AC#1 | Chrome | (empty) | xxxx----- | https://secure.eyemedvisioncare.com/regi... |
| AC#1 | Chrome | (empty) | xxxxxx----- | https://resy.com/ |
| AC#1 | Chrome | (empty) | xxxx----- | https://account.activedirectory.windowsa... |
| AC#1 | Chrome | (empty) | xxxx----- | https://www.disneyplus.com/ |
| AC#1 | Chrome | (empty) | xxxxx----- | https://www.zillow.com/user/account/upda... |

Figure 6C

Category: Accounts
Password Reuse Detected

Description: The same password was found being used for multiple accounts. If one account is compromised, you risk compromising others using the same or similar passwords. Password reuse is commonly associated with identity theft and phishing attacks.

Remediation: Use a password manager and different passwords for each site. Consider training the team on managing and creating passwords.

| Computer Name | Username | Login Name | Password | URL |
|---|---|---|---|---|
| AC#1 | UserName | Login@aol.com | XXX---- | 49 sites |
| AC#1 | UserName | Login@gmail.com | XXX---- | 23 sites |

Figure 6D

OFFICE

Category: Office

M365 Company Administrators

Description: The following is a list of M365 company admins for this organization.

| Display Name | User Principal Name | Roles Assigned |
|---|---|---|
| Jonathan Smith | John@Smith.com | Company Administrator |
| Jon Smith | john@SmithInc.com | Company Administrator |

Category: Office

Multifactor Authentication (MFA) Not Properly Enabled

Description: Multifactor Authentication (MFA) is not properly enabled on all user accounts. This may cause an attacker easier access to those accounts, especially through phishing attacks. During a phishing event, attackers trick the user into sharing their password. The attackers then use the password to access the user#'s M365 accounts.

Remediation: Enable and enforce MFA for all users who have access to your corporate email and infrastructure.

Default MFA
Method

| Display Name | User Principal Name | |
|---|---|---|
| Jon Smith | js@SmithInc.com | |

Figure 7A

Category: Office

M365 Users With Passwords Older Than 90 Days

Description: The following accounts are relying on passwords that have not been changed in over 90 days. Attackers use compromised credentials, password sprays and phishing to gain access to M365 accounts.

Remediation: Consider enforcing a password change policy that requires password changes within a 90-day time frame. Also, require the listed accounts to get a password change.

| Display Name | User Principal Name | Password Last Changed |
|---|---|---|
| Jon Smith | JS@SmithInc.com | 2020-07-10 20:09:29 |
| Jonathan Smith | JS@Smith.com | 2021-04-04 21:53:30 |

Category: Office

Legacy Protocols Not Properly Disabled

Description: Hackers use legacy protocols like POP3 and IMAP to bypass multifactor authentication.

Remediation: Disable legacy protocols for these accounts.

Figure 7B

Display Name   POP Enabled IMAP Enabled
Jon Smith True   True

Category: Office
M365 Users With MFA

Description: The following is a list of M365 accounts for this organization that have Multi-Factor Authentication (MFA) enabled.

Display Name   User Principal Name   Default MFA Method
Jon Smith   JS@Smithinc.com   OneWaySMS Category: Office
Global Administrator Accounts Easily Compromised Description: Global Administrator Accounts appear to be used as a daily driver account. In the event this account gets compromised, an attacker would gain access to the entire M365 environment.

Remediation: Create separate unlicensed accounts for Global Administrators. Only access these accounts when needed. Use a web browser in incognito / private mode when using a global administrator account.

Display Name   User Principal Name   Roles Assigned
Jon Smith   
Company Administrator

Figure 7C

Category: Office

M365 Company Admins without MFA

Description: The following accounts are company administrator accounts that do NOT have multi-factor authentication (MFA) enforced.

Remediation: It is best practice to enforce MFA for all M365 accounts, especially those with the Company Administrator role assigned.

| Display Name | User Principal Name | Roles Assigned | Default MFA Method |
|---|---|---|---|
| Jon Smith | js@SmithInc.com | Company Administrator | |

Figure 7D

ANTIVIRUS

Antivirus System Did Not Produce Alerts For Password Cracking Attempts

Category: Antivirus

Description: When an attacker phishes a user, they use tools on the device to crack passwords. It does not appear that the antivirus in this environment is producing the proper alerts for this type of behavior.

Remediation: Verify antivirus is configured to detect malicious behavior like dumping NTLM hashes.

Category: Antivirus

Windows Defender Advanced Threat Protection Is Installed Within The Environment

Description: Windows Defender Advanced Threat Protection Service installed in the environment.

| Computer Name | Username |
|---|---|
| AC#1 | JonSmith |

Figure 8

FIREWALLS

Firewall Deep Scan Results

Category: Firewalls

Description: The firewall did not block traffic containing a malicious payload.

Remediation: Verify deep packet inspection is properly enabled and configured for HTTPS traffic.

Category: Firewalls

Personal Website Browsing Found On Work Devices

Description: Personal browsing and unrestricted access to social media, unmonitored websites, or personal accounts increase your risk of malware infections and phishing attacks on your network.

Remediation: Communicate specific guidelines for web browsing and internet use at work and on work-issued devices. Also, consider blocking suspected malware-containing or insecure websites on work machines and within your environment.

| Computer Name | Username | Browser | |
|---|---|---|---|
| AC#1 | JonSmith | Chrome | https://www.facebook.com/groups/ |

Figure 9

ENCRYPTION

Category: Encryption

Unencrypted Hard Drives

Description: The following lists all unencrypted drives found in the network.
Remediation: Make sure drives are encrypted.

| Computer Name | Username | Drive Name | Drive Format | Drive Type | Encryption Status |
|---|---|---|---|---|---|
| AC#1 | JonSmith | C:\ | NTFS | Fixed | Fully Decrypted |
| AX#1 | JonSmith | D:\ | NTFS | Fixed | Fully Decrypted |

Figure 10A

Category: Encryption
Open Wifi Used

Description: Computers have connected to open WiFi networks. These networks were stored in memory on the devices. Attackers use man-in-the-middle attacks with open WiFi networks to gather passwords, account information and even data.

Remediation: Remove open WiFi networks from computers. Consider training users on WiFi hacker avoidance. Suggest users utilize a MiFi device or tether a phone for WiFi access while traveling.

| Computer Name | Username | SSID | Authentication Type | Encryption Type |
|---|---|---|---|---|
| AC#1 | USER ID | WiFi-guest | open | none |

Figure 10B

Category: Encryption

Sensitive Data Being Emailed

Description: Sensitive data is allowed to be transferred through unsecure avenues like email.

Remediation: Since e-mail is a highly unsecure way of sending PII (personally identifiable information) such as health-related information or medical records, social security numbers, credit card banking or financial information, it's essential to have e-mails encrypted to prevent the contents from being read by anyone other than the intended recipients. We strongly encourage a more extensive and robust assessment be done immediately to determine what if any exposure you may have.

Figure 10C

Category: Encryption

Sensitive Data Being sent via Cloud File-Sharing Applications

Description: Sensitive data is currently allowed to be transferred through cloud file-sharing applications.

Remediation: Depending on the type of file-sharing application used, you may have security considerations to address. We do not endorse the use of free versions of file-sharing applications. If file-sharing applications are in use, best practice is to use a business version that offers appropriate security controls to safeguard your data. Our assessment will detect if any file-sharing applications are installed on computers connected to your network. If file-sharing applications are found, we recommend a further analysis to determine if anyone is using the free versus business versions of these applications and if the data being placed in these systems is being done so according to best practices to ensure the security of your data.

Figure 10D

SURVEILLANCE

General Surveillance Warning

Category: Surveillance

Description: See antivirus and firewall section - it does not appear that alerting is properly configured to detect an advanced persistent threat in the environment.

Remediation: See antivirus and firewall section to address issues.

Figure 11

SYSTEM AND METHOD FOR A USER ACTIVATED PENETRATION TEST

RELATED APPLICATIONS

This utility patent application claims priority to and incorporates by reference the provisional patent application titled "SYSTEM AND METHOD FOR A USER ACTIVATED PENETRATION TEST" (Ser. No. 63/256,528) filed on Oct. 15, 2021.

BACKGROUND OF THE INVENTION

According to Cybercrime Magazine, the annual global losses resulting from cybercrime could reach $10.5 trillion dollars by 2025. That would make the world-wide economic value of cybercrimes in 2025 larger than the GDP of any nation except for the United States and China. Data loss, data theft, lost productivity, fraud, stolen money, intellectual property theft, and the time spent investigating and remediating such losses represent a significant drain on businesses and consumers alike.

One important category of security breaches is referred to as "malware". Malware is a term used to describe software that has malicious intent. Examples of malware include but are not limited to trojans, distributed denial of service attacks, spyware, viruses, adware, rootkits, ransomware, worms, zombies, and keyloggers. Common sources of malware are email attachments, malicious websites, torrents, The battle against malware sometimes been described as "whack-a-mole" as cyber security software struggles to stay up to date in responding to the latest threats. Instead of merely relying primarily on reactive measures to deal with the malware that is already operating in a user's computer, it would be desirable to instead invoke a proactive assessment and identification of security vulnerabilities before malware infects the computer. "White hat" hacking involves "penetration testing" performed for the purposes of assessing cybersecurity vulnerabilities. However, most households and most businesses do not have ready access to such services. Even large companies, government agencies, and other institutions rich in resources cannot invoke such services in a timely and convenient manner.

It would be desirable to empower everyday users of computers with their own "white hat" penetration assessments without having to retain highly trained cybersecurity professionals or experienced ethical hackers.

The system is described in greater detail below in the Summary of the Invention section.

SUMMARY OF THE INVENTION

The invention relates generally to the systems and methods that provide for information security. More specifically the invention is a system and method for a user activated penetration test (collectively, the "system").

The system empowers an ordinary user to initiate a penetration application on their computer and/or network of computers. No special expertise is required by such a user. The penetration assessment can be performed using software instead of an expensive team of "white hat" hackers. The penetration application can be used on the assessed computer in response to a request from the user that is communicated to a host computer in which the penetration application is hosted.

In some embodiments, such as system can operate in various operating modes. For example, a penetration application can operate on a snap-shot basis, revealing vulnerability of a computer at a specific point in time. Another potential operating mode would be a continuous basis, in which different user actions or omissions can trigger updated vulnerability data and applicable alerts. Yet another potential operating mode would be a training mode, in which the system operates on a continuous basis, but the system is adapted to provide users with communications educating them as to how their actions trigger certain vulnerabilities and how more prudent behavior can help make that user's computer more secure. Different embodiments of the system can involve different operating modes and different capabilities by users to customize communications, alerts, educational levels, etc.

The system can be better understood by referencing the drawings discussed below.

BRIEF DESCRIPTION OF THE DRAWINGS

Different examples of various attributes, components, and configurations that can be incorporated into the system are illustrated in the drawings described briefly below. No patent application can expressly detail in words or in drawings all of the potential embodiments of an invention. In accordance with the provisions of the patent statutes, the principles, functions, and modes of operation of the system are illustrated in certain preferred embodiments. However, it must be understood that the system may be practiced otherwise than is specifically illustrated without departing from its spirit or scope.

FIG. 1 is a block diagram illustrating an example of a system in which a user initiates a penetration request from an assessed computer to utilize a penetration application on a host computer to be run on the assessed computer, collecting vulnerability data related to the assessed computer.

FIG. 3A is a block diagram illustrating an example of the penetration application being applied to a domain controller.

FIG. 3B is a block diagram illustrating an example of a follow-up process to FIG. 3A, where the penetration application is being applied to the domain joined computers corresponding to the domain controller of FIG. 3A.

FIGS. 5A-5D are a collective example of a vulnerability report with respect to "Methods".

FIGS. 6A-6D are a collective example of a vulnerability report with respect to "Accounts".

FIGS. 7A-7D are a collective example of a vulnerability report with respect to an "Office" cloud service.

FIG. 8 is an example of a vulnerability report with respect to "Antivirus".

FIG. 9 is an example of a vulnerability report with respect to "Firewalls".

FIGS. 10A-10D are a collective example of a vulnerability report with respect to "Encryption".

FIG. 11 is an example of a vulnerability report with respect to "Surveillance".

Figures 2A, 2B:
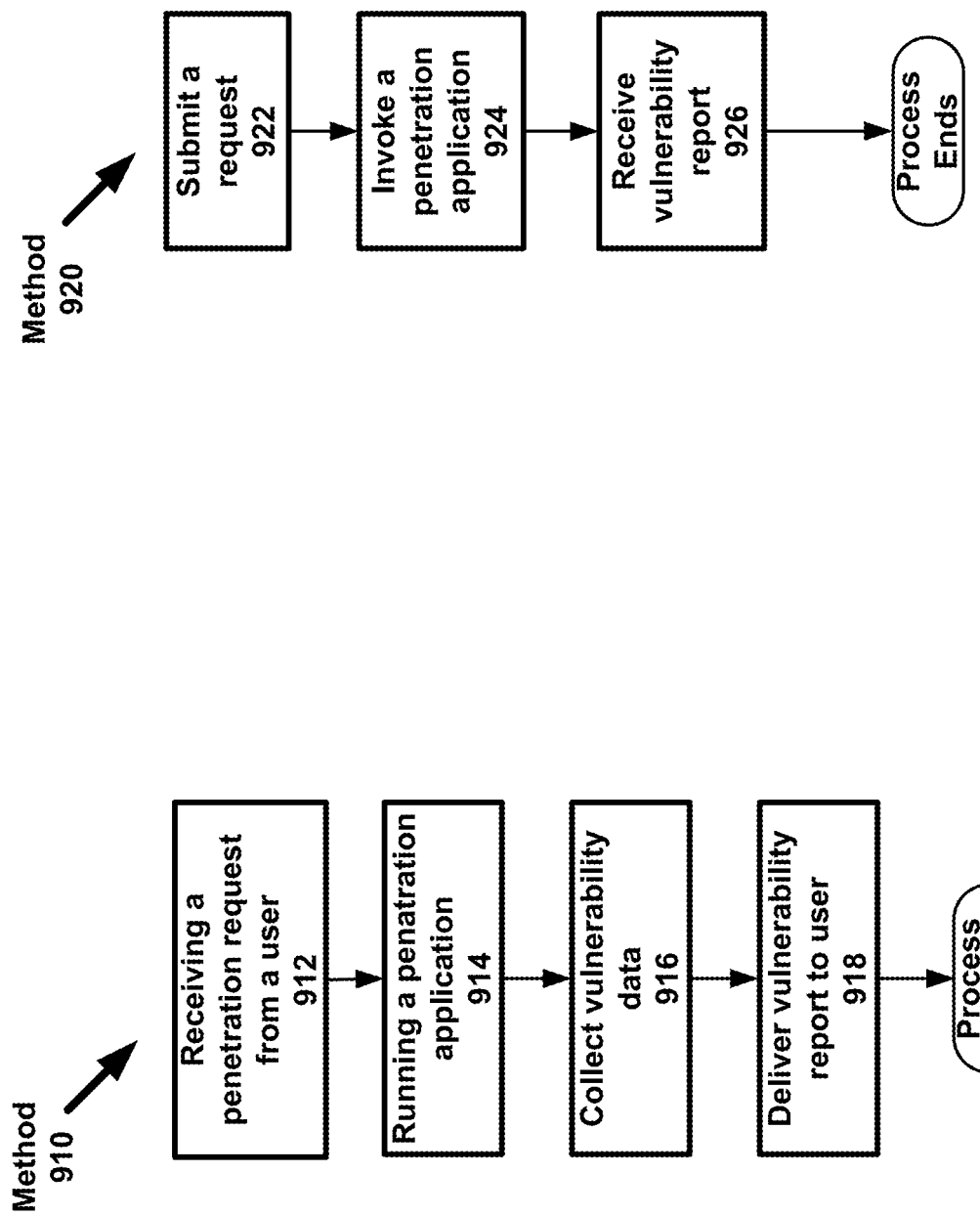
FIG. 2A is a flow chart diagram illustrating an example of a method for a user-activated penetration test from the standpoint of the system.
FIG. 2B is a flow chart diagram illustrating an example of a method for a user-activated penetration test from the standpoint of the user.

The system can be further understood by the text description provided below in the Detailed Description section.

DETAILED DESCRIPTION

The invention relates generally to the systems and methods that provide for information security. More specifically the invention is a system and method for a user activated penetration test (collectively, the "system"). All element names and element numbers are listed and defined in Table 1 below.

I. Overview

The system 100 allows ordinary users 80 without any cybersecurity expertise to initiate the evaluation of their own computers 200. The system 100 can be used to collect, update, store, analyze, and explain a wide variety of different categories of vulnerability data 500 pertaining to the assessed computer(s) 220. The system 100 enables an ordinary user 80 to access the power of their own personal and automated "white hat" hacker team in the form of a penetration application 310.

The user-driven system 100 can inform users 80 was to what would happen for example if the user 80 clicked on a malicious link in their inbox, on a website, or from some other source or location. Users 80 can learn about their vulnerability data 500 proactively, instead of being relegated to deal with malware or data breaches after they occur. Instead of relying on IT experts or even cybersecurity experts, the user 80 can rely on a highly automated system 100 that is nonetheless triggered by the user 80 can be configured to educate the user 80 at the user's 80 level of skill and experience.

Users 80 can uncover misconfigurations, vulnerabilities, exposed personally identifiable information before problems occur and without outside assistance. Organizations can empower their users 80 to substantially increase the security of their computers 200 without relying on cybersecurity experts or even more generalized IT technical support.

Being able to review a networks security, by company ownership or other stake holders without engaging the IT team makes it so they can tell if the security measures are actually deployed and working. The system 100 is superior to prior art alternatives that are typically limited to larger resource-intensive organizations, such as: (A) having a highly invasive IT department that request user passwords, limit the ability of a user 80 to visit certain websites or use certain applications or services; review network 230 activity from a vulnerability standpoint, etc.; (B) pay cybersecurity experts to manually hack into the network 230 periodically in order to identify security vulnerabilities; or (C) deploy complex hardware tools that analyze the environment. None of these three options can be easily and autonomously invoked by an ordinary user 80. None of those three options are a viable option for ordinary consumer or household user 82, without access to an IT professional 84 much less a security expert 86.

The system 100 can be implemented to provide the advantages of all three of the approaches identified above, while minimizing cost and inconvenience. Moreover, the system 100 can empower everyday consumers or household users 82 with the click of a mouse. The ability to access meaningful security feedback in a timely manner can be critical to avoiding the damages that can result from security breaches.

The system 100 represents a paradigm shift for security. Apathy is the number one pathway attackers break into networks 230. Apathy is rooted in human nature, which tends to underestimate risk. The inability of an individual user 80 to do anything about it contributes to this apathy, because with the system 100, ordinary users 80 are not empowered to make a significant contribution to addressing these risks. The system 100 creates a tool that empowers individual users 80, and by awakening individual users 80 with an "aha moment", the system 100 can be become a mechanism for proactive and meaningful engagement by users 80 whether protecting themselves their household, their small business, or their employer.

The penetration application 310 is "white hat" malware, an authorized and simulated cyberattack on the assessed computer(s) 220 to evaluate the security of the assessed compute(s) 220 and connecting network(s) 230.

The system 100 can be implemented in a wide variety of different embodiments. Different embodiments can involve different operating modes 110. For example, the system 100 can be configured to operate in a snap-shot mode 112, a training mode 114, or a continuous surveillance mode 116. Some embodiments of the system 100 can enable everyday users 80 to freely and instantaneously change the operating mode 110 of the system 100.

The system 100 can be implemented with respect to individual assessed computers 220, as well as entire domains of domain joined computers 228 across various networks 230.

In a preferred embodiment of the system 100, the application(s) 202, databases 204, and data 205 used to provide the functionality of the system 100 reside on a host computer 210 such as a host server 212 across a computer network 230 in order to analyze one or more assessed computers 220. This configuration empowers access to the system 100 by the user 80 without making the user 80 responsible for maintaining, updating, or hosting the infrastructure of the system 100. Such a configuration makes it easier for security experts 86 to keep the system 100 updated with regards to security threats and providing a point-and-click solution for users 80 who want specific remediation suggestions 610, remediation warnings 620, and other communications from the system 100.

II. Alternative Embodiments

Different examples of various attributes, components, and configurations that can be incorporated into system 100 are illustrated in the drawings and described in Table 1 below. However, no patent application can expressly disclose in words or in drawings, all of the potential embodiments of an invention in a comprehensive manner. In accordance with the provisions of the patent statutes, the principles, functions, and modes of operation of the system 100 are illustrated in certain preferred embodiments. However, it must be understood that the system 100 may be practiced otherwise than is specifically illustrated without departing from its spirit or scope. Alternative embodiments of the system 100 can be described and categorized on the basis of a variety of variables.

III. Glossary of Terms

All terminology associated with an element number is defined in Table 1 below.

TABLE 1

| # | Name | Definition/Description |
|---|------|------------------------|
| 80 | USER | A person who (or in some instances an automated information technology configuration that) invokes the operation of the system 100. In many embodiments, the user is typically a human being, such as a household user 82 or an IT user 84. |
| 82 | Household User | A user 80 is a human being who possesses no particular expertise with respect to information technology. A household user 82 can also be referred to as a consumer 82, as a household user 82 is a person with the basic ability to access the Internet through a web browser or other commonly used apps to interact with the outside world. |
| 84 | IT User | A user 80 who possesses expertise in the field of information technology. |
| 86 | Security Expert | An IT expert 84 who possesses expertise in the field of data and IT security. |
| 100 | SYSTEM | A configuration of hardware, software, and data the collectively function to assess the security of an assessed computer. |
| 110 | Mode | A way or manner in which the system 100 operates. Examples of different modes 110 include a snap-shot mode 102, a training mode 114, and a continuous surveillance mode 116. Some embodiments of the system 100 can be implemented to operate in only one mode 110, while other embodiments of the system 100 can include multiple operating modes 110. In a preferred embodiment of the system 100, a user 80 is given the ability to change the operating mode 110 of the system 100. |
| 112 | Snap-shot mode | A mode 110 in which the penetration application 310 captures vulnerability data 500 that relate to the then current state of the assessed computer 220. |
| 114 | Training mode | A mode 110 in which the penetration application 310 captures vulnerability data 500 on a continuous basis in response to the actions of the user 80. While in training mode 114, the penetration application 310 can generate remediation suggestions 610 in real time and provide such suggestions 610 to users 80 in a tutorial or training context, so that users 80 can better understand how their actions can place their computer 200 at risk. |
| 116 | Continuous surveillance mode | A mode 110 in which the penetration application 310 captures vulnerability data 500 on a continuous basis in response to the actions of the user 80. |
| 200 | COMPUTER | An electronic device for processing data 205 and running applications 202. Computers 200 can be implemented in a wide range of different devices, ranging from wearable computers (such as a smart watch), mobile computers (such as tablets, smart phones, and wearable computers), portable computers such as laptops, desktop computers, workstations, minicomputers, microcomputers, mainframe computers. Computers 200 can also be collectively characterized as either servers or client devices. Computers 200 use one or more processors 202. |
| 201 | Processor | A processor 201 is typically an integrated electronic circuit that performs the calculations that enable a computer 200 to function. A processor 201 is often referred to as a central processing unit or CPU 201. A processor 201 typically includes non-persistent memory, such as one or more random access memory (RAM) components. |
| 202 | Application | A computer program that is run on a computer 200. In most instances, a copy of the application 202 is stored in a storage component 203 of the computer 200. |
| 203 | Storage Component | A mechanism by which a computer 200 stores data 205 in a persistent way that survives the turning off of the computer, such as hard drive, flash drive, DVD disc, optical drive, etc. |
| 204 | Database | An application 202 that organizes the storing, accessing, and updating of data 205. A relational or SQL database is a common example of a database 204. |
| 205 | Data | Information that is accessed by a computer 200. |
| 206 | Port | A communication capability that exists on a computer 200. Without a port 206 a computer 200 cannot communicate with other computers 200. |
| 210 | Host Computer | The computer 200 on which the penetration application 310 originates. |
| 212 | Host Server | A host computer 200 that is configured and adapted for the purpose of making penetration applications 310 available to assessed computers 220. |
| 220 | Assessed Computer | The computer 200 for which vulnerability data 500 is being collected. |
| 222 | Household Computer | An assessed computer 220 that it utilized for personal use in a household. |
| 224 | Mobile Client Device | An assessed computer 220 that is a mobile computer such as a wearable computer, tablet, or smart phone. |
| 226 | Domain Controller | A computer 200 or server that controls a domain of computers 200. A domain controller 226 implements a common set of rules across all of the domain joined computers 228 and other devices within the applicable domain. |
| 228 | Domain Joined Computers | A computer 200 that belongs to a domain and as such is subject to the rules of the domain controller 226. |
| 230 | Network | A communication capability that enables the exchange of data 205 between two or more computers 200. Networks 230 can connect computers 200 of similar or different domains. |
| 232 | Friendly Network | A network 230 that the user 80 desires to engage with. |
| 234 | Wired Network | A network 230 that uses wires, cables, and other similar hardware to connect computers 22 |
| 236 | Wireless Network | A network 230 that uses signals transmitted through the air and not wires or cables to communicate with different computers 200 and other devices. |
| 238 | Router | A device that controls the node of a network 230. |
| 240 | Firewall | A configuration of hardware and/or software components that block unauthorized access to data 205 and the processor 201 while permitted outward communications. |
| 242 | Network Device | |
| 300 | Penetration Request | A request by a user 80 for the system 100 to assess the vulnerability of an assessed computer 220. In many embodiments, a penetration request 300 is accomplished by a user 80 clicking on a link, button, or other similar interface control on website associated with the host computer 210. |
| 310 | Penetration Application | An application 202 that is used to penetrate the assessed computer 202 for the purposes of collecting vulnerability |

TABLE 1-continued

| # | Name | Definition/Description |
|---|---|---|
| | | data 500 pertaining to the assessed computer 202. |
| 312 | Installed Penetration Application | A penetration application 310 is stored onto a storage component 203 of the assessed computer 220. |
| 330 | Encrypted Vault | A collection of vulnerability data 500 that is stored in a secured and encrypted form for subsequent analysis. |
| 340 | Artificial Intelligence Engine | An application 202 or configuration of applications 202 that enable a computer 200 to perform a task that typically requires human intelligence. An artificial intelligence engine 340 can include an expert system engine 342 and/or a machine learning engine 244. |
| 342 | Expert System Engine | A category of artificial intelligence that utilizes automated processing rules embodying the expertise of human beings |
| 344 | Machine Learning Engine | A category of artificial intelligence that utilizes statistical analyses. |
| 500 | Vulnerability Data | Information relating to the security or lack thereof of one or more assessed computers 220. Categories of vulnerability data 500 can include but are not limited to accounts data 510, antivirus data 520, firewall data 530, and encryption data 540. Examples of vulnerability data 500 can include but are not limited to missing security tools 550, reused passwords 560, personally identifiable data 570, network configurations 580, and domain security policies 590. |
| 510 | Accounts Data | Vulnerability data 500 that relates to the accounts associated with the user 80. |
| 520 | Antivirus Data | Vulnerability data 500 that relates to antivirus applications 202. |
| 530 | Firewall Data | Vulnerability data 500 that relates to the status and configuration of a firewall 240. |
| 540 | Encryption Data | Vulnerability data 500 that relates to use and attributes of encryption technology. |
| 550 | Missing Security Tool | Vulnerability data 500 that relates to use and configuration of security tools. |
| 560 | Reused Password | Vulnerability data 500 that relates to use of passwords. |
| 570 | Personally Identifiable Data (PII) | Vulnerability data 500 that relates to data 205 that can be used identify a specific human being. |
| 580 | Network Configuration | Vulnerability data 500 that relates to the configuration of a network 230. |
| 590 | Domain Security Policy | Vulnerability data 500 that relates to a security policy of n applicable domain. |
| 600 | UPDATEABLE SECURITY DATABASE | An ongoing database 204 of known security threats, prudent security practices, and potential remediation suggestions 610. |
| 610 | Remediation Suggestion | A proposed action item to address a vulnerability datum 500. |
| 612 | Reset password | A specific type of remediation suggestion 610 which involves changing a password. |
| 620 | Remediation Alert | A notification of a security vulnerability. These can be sent in real-time or periodically in batches. |
| 900 | METHOD | One or more processes or subprocesses performed by the system 100. |

IV. Description of Elements

FIG. 1 is a block diagram illustrating an example of a system 100 in which a user 80 initiates a penetration request 300 from an assessed computer 220 to utilize a penetration application 310 on a host computer 210 to be run on the assessed computer 220, collecting vulnerability data 500 related to the assessed computer 220.

This example illustrates a configuration where the hosted application 310 is utilized by an individual user 80 on an individual computer 200, such as a typical consumer or household user 82 without any particular IT security expertise being able to invoke and leverage the IT security expertise that is embodied in the penetration application 310.

In some embodiments, the penetration application 310 can be hosted on a computer 200 operated by the user 80 of the application 310, but the use of a remotely hosted service that is supported and updated by IT security experts is a preferred implementation of the system 100.

The system 100 of FIG. 1 can be implemented in a wide variety of different configurations of computers 200, networks 230, and categories of vulnerability data 500. The system 100 can also be configured to operate in different modes 110, as well as to manage complex infrastructures of different domains of networked computers 200.

The system 100 can be used to capture vulnerability data 500 for a wide variety of different assessed computers 220, which can be wearable computers, mobile computers, desktop computers, main-frame computers or any other kind of computer 200. The system 100 can be used on multiple assessed computers 220 that are connected to a network 230.

In many instances, the computer 200 used by the user 80 to invoke a penetration request 300 is the assessed computer 220, but other computers 200 could also be used. For example, a user 80 could initiate the request 300 on their mobile phone for the purpose of assessing a desktop computer, or vice versa. A penetration request 300 can take many forms, it could be a communication such as an e-mail, text message, instant message, etc. It can also be a link or other control that the user 80 accesses on website or through an application.

In a preferred embodiment, the penetration application 310 resides on a host computer 210. The host computer 210 makes the penetration application 310 accessible to the accessed computer 220 after the host computer 210 receives the penetration request 300. The penetration application 310 can be sent to the assessed computer 220 on the same network 230 that is used to transmit and receive the penetration request 300.

The system 100 can be implemented in a wide variety of IT infrastructures/environments, with the host computer 210 and assessed computer 220 separated by firewalls 240. A wide variety of different vulnerability data 500 can be captured, such as vulnerability data 500 includes a plurality of accounts data 510, a plurality of antivirus data 520, a plurality of firewall data 530, and a plurality of encryption data 540. Vulnerability data 500 can also include a remediation suggestion 610 such as the many suggestions provided in the example of a security report that is provided in the figures. Some embodiments of the system 100 can use an artificial intelligence engine 340 and/or an updateable security database 600 to make the system 100 "smarter" in the future.

V. Process Flow Views

A. Host Perspective

FIG. 2A is a flow chart diagram illustrating an example of a method 910 for a user-activated penetration test from the standpoint of the host computer 200.

At 912, the penetration request 300 is received from a user 80.

At 914, the penetration application 310 is run on the assessed computer 220 with software that resides on or originates from on the host computer 200.

At 916, vulnerability data 500 is captured.

At 918, the vulnerability data 500 is communicated or otherwise made accessible to the user 80.

B. User Perspective

FIG. 2B is a flow chart diagram illustrating an example of a method 920 for a user-activated penetration test from the standpoint of the user 80.

At 922, the user 80 submits a penetration request 300 to the system 100. This can be done by clicking a link on a website, sending an e-mail, or some other configuration of actions that collectively communicate the request and permission of the user 80.

At 924 the user 80 invokes the penetration application 310 and the system 100 provides the user 80 with a specific triggering action to be taken by the user 80.

At 926, the user 80 receives the vulnerability data 500.

C. System

Figure 2C:
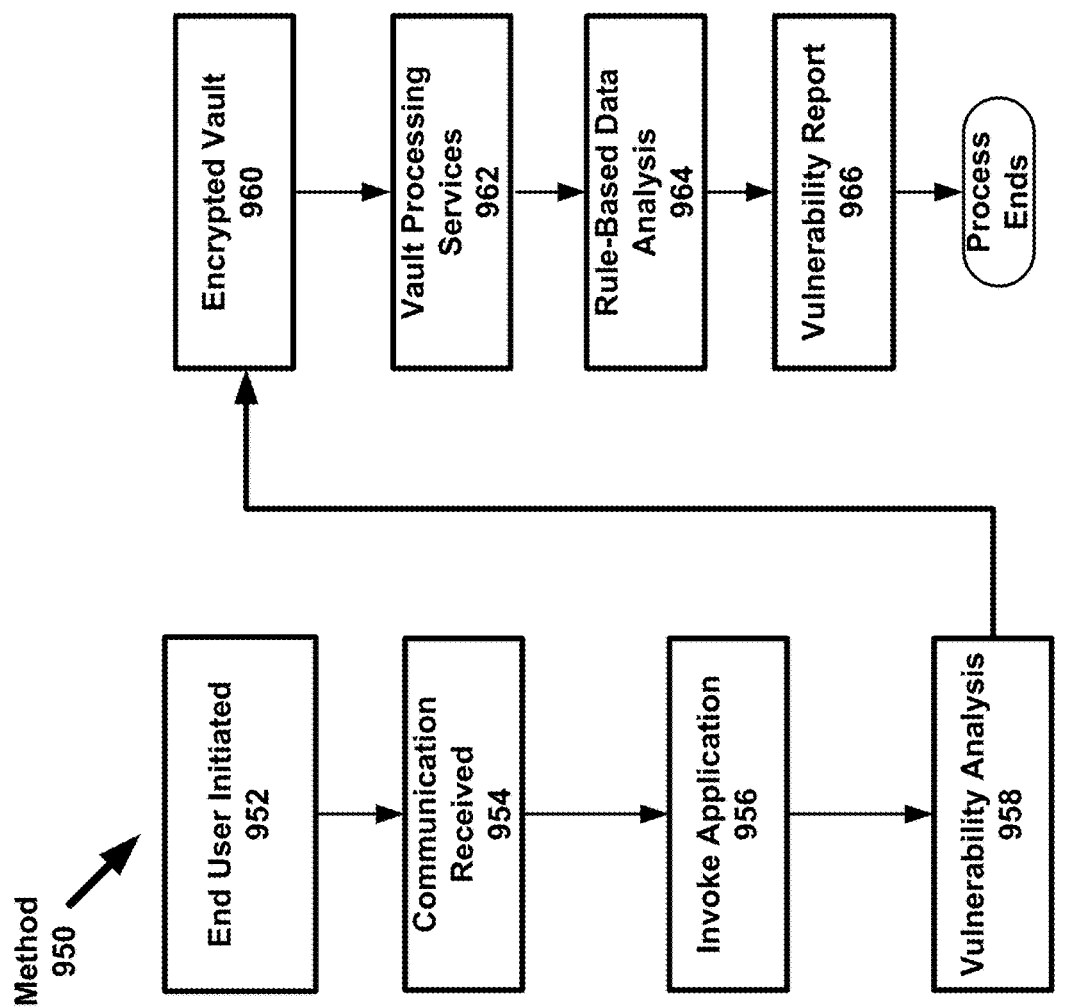
FIG. 2C is a flow chart diagram illustrating an example of a method for a user-activated penetration test from the standpoint of both users and the system.

FIG. 2C is a flow chart diagram illustrating an example of a method 950 for a user-activated penetration test from the standpoint of the system 100 as a whole.

1. End User Initiates at 952

The ability to analyze the network without IT permission is considerably more relevant, because, as you know, a hat unlike other solutions, the IT department does not have to be engaged to perform this third-party security analysis. This allows stakeholders like business owners, board members, and even end users to perform an analysis of their security posture without waiting for or alerting IT. The ability to analyze the network without IT permission is considerably more relevant, because, as you know, a hacker is not going to give the IT department a heads-up before attacking the environment.

2. Email Received at 954

User receives link via email. Each link is customized for tracking purposes. The email with the link making it through the firewall/spam filter is the first step in the analysis. A key component of this demonstration is showing the user how easily they could slip up and allow an attacker on to their network.

3. Click Special Link at 956

Once the user receives the link, they click on it and an application runs. This simulates the actual action of clicking a malicious link. As with many good phishing attacks, the user is not notified, asked for additional rights, or warned as the process begins. #Once the link is clicked, the server compiles a new, never been used before, executable to bypass antivirus signature analysis.

4. Computer Analysis at 958

During the analysis, the system 100 evaluates data on the device looking for personally identifiable information (PII), passwords, cached credentials, data in the registry, cloud storage, tokens, configuration information, as well as vulnerabilities that could be used to escalate privileges or move laterally. The system 100 can also analyze other devices on the network, M365 security settings, Google Security Settings, as well as firewall ability to identify and block malicious payloads.

5. Encrypted Vault at 960

Upon completion, meta data is packed up into a 4096 bit encrypted vault. This vault is then uploaded to the system using a standard HTTPS connection #If HTTPS is blocked, this data is processed into a number of DNS requests which are used to exfiltrate the data using standard requests. #If a particular domain is blocked, the system automatically attempts a number of backup domains for vault recovery.

6. Vault Processing Service at 962

After the vault is uploaded, it is processed, the meta data is extracted and compared to known information including password hashes, known vulnerabilities, as well as a number of external ip address databases. This data is queued up for analysis.

7. Rule Based Data Analysis at 964

Once multiple encrypted vaults arrive for a network, these vaults are analyzed using rules that identify missing security tools, password reuse, personally identifiable information, network configuration, domain security policy, endpoint protection tools, as well as misconfigurations to identify attack vectors. #Meta data currently being archived to build an Artificial Intelligence engine for processing and finding additional attack vectors.

8. Non-Technical Results at 966

Once multiple encrypted vaults arrive for a network, these vaults are analyzed using rules that identify missing security tools, password reuse, personally identifiable information, network configuration, domain security policy, endpoint protection tools, as well as misconfigurations to identify attack vectors. #Meta data currently being archived to build an Artificial Intelligence engine for processing and finding additional attack vectors.

VI. Domain-Level Security Analysis

The system 100 can be highly desirable both in the context of individual consumers or household users 82 evaluating the security vulnerability data 500 of a single computer 200. The system 100 can however also be used to evaluate the security vulnerability data 500 for all of the computers 200 associated with a particular domain, potentially spanning numerous networks 230 and sub-domains.

FIG. 3A is a block diagram illustrating an example of the penetration application 310 being applied to a domain controller 226. Local Active Directory Domain Analysis: On a corporate network that includes a domain controller, The system 100 can contact the domain controller 226. It can request a list of users, security groups, security policy, certificates, and computers on the network. This process can be done as a non-privileged user 80.

The domain controller 226 is the computer 200 responsible for setting the security rules for all of the domain joined computers 228. FIG. 3A is a first step that then leads to the actions illustrated in FIG. 3B.

FIG. 3B is a block diagram illustrating an example of a follow-up process to FIG. 3A, where the penetration application is being applied to the domain joined computers 228 corresponding to the domain controller 226 of FIG. 3A.

Once the system 100 has the list of computers 200, it can attempt to initiate SMB, RPC, and WMI access to each of the other devices. Any information that is gathered is added to the encrypted vault that is submitted back to the vault processing service. This tactic allows a single click analysis of an entire domain using an unprivileged user account.

Figure 3C:
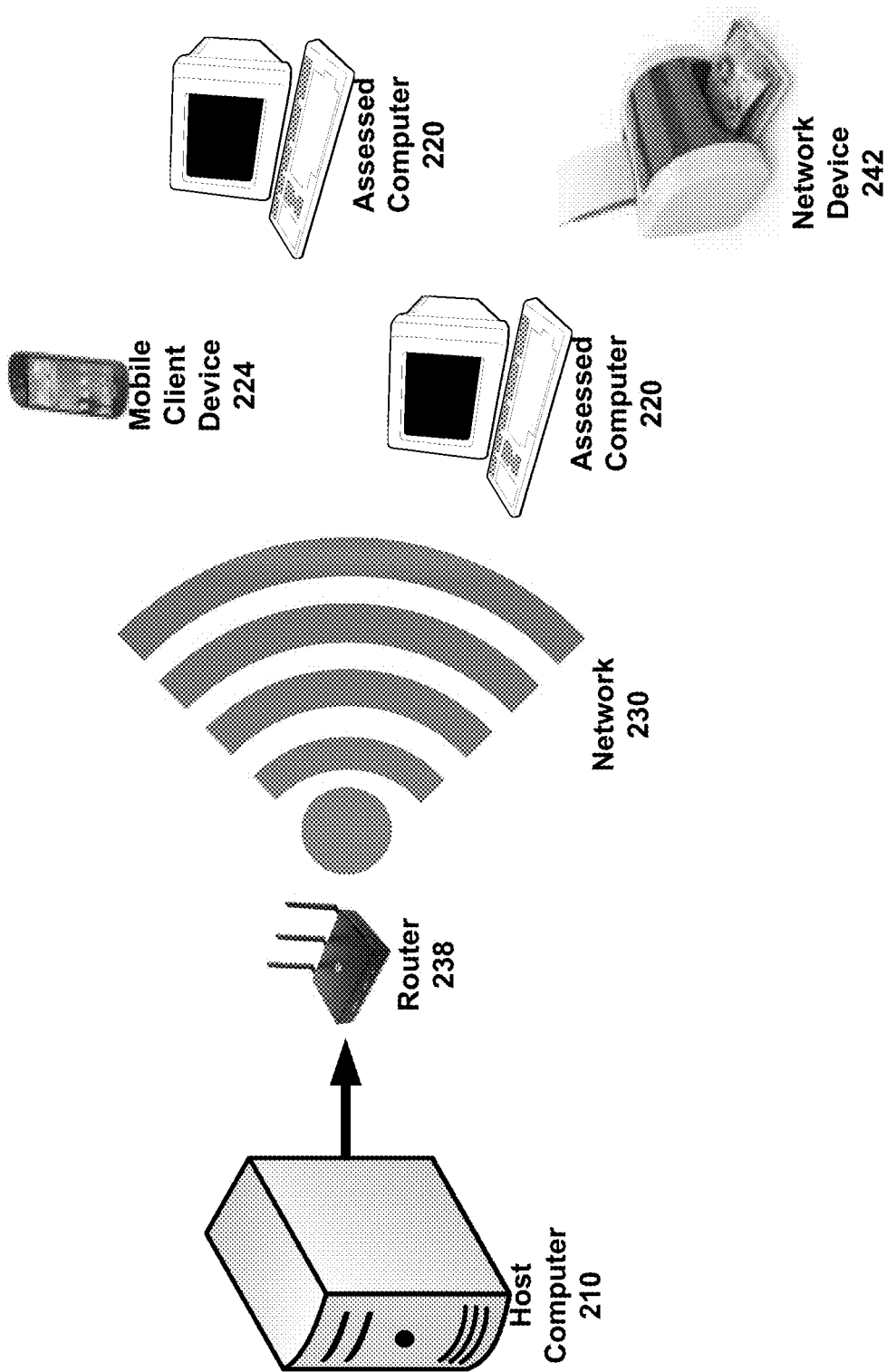
FIG. 3C is a block diagram illustrating an example of a follow-up process to FIG. 3B, where the penetration application is being applied to the network-connected computers and devices from the domain joined computers network.

FIG. 3C is a block diagram illustrating an example of a follow-up process to FIG. 3B, where the penetration application 310 is being applied to the network-connected computers 200 and devices from the domain joined computers network, this can include network devices 242 such as printers, scanners, cameras, sensors, speakers, etc.

The penetration application 310 can be configured to abuse the user's privileges to go through and analyze their M365 tenant without having a password, or MFA token. The system 100 can use a normal users rights to review their cloud infrastructure as well as domain infrastructure.

The system 100 can uses ARP to identify all of the computers 200 and devices connected to the network 230. It then performs a port scan of all devices connected. During the port analysis, The scan by the system 100 grabs any protocol banners available. The information gathered during this step is submitted to the vault processing service and used to identify additional attack vectors based on known vulnerabilities during the rule based data analysis phase.

V. Subsystem View

Figure 4:
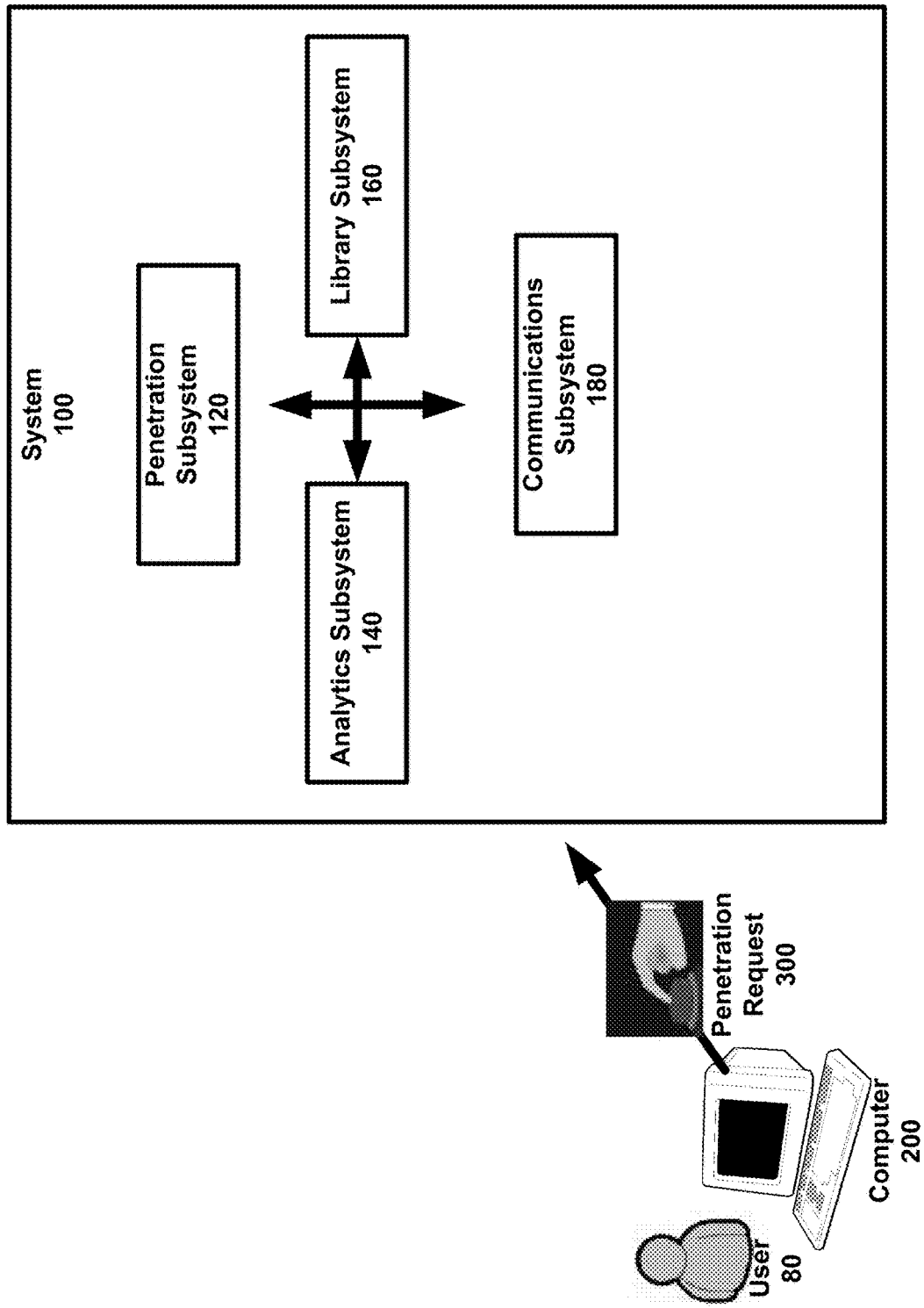
FIG. 4 is a block diagram illustrating an example of a subsystem view of the system.
Figure 5B:
Figure 5C:
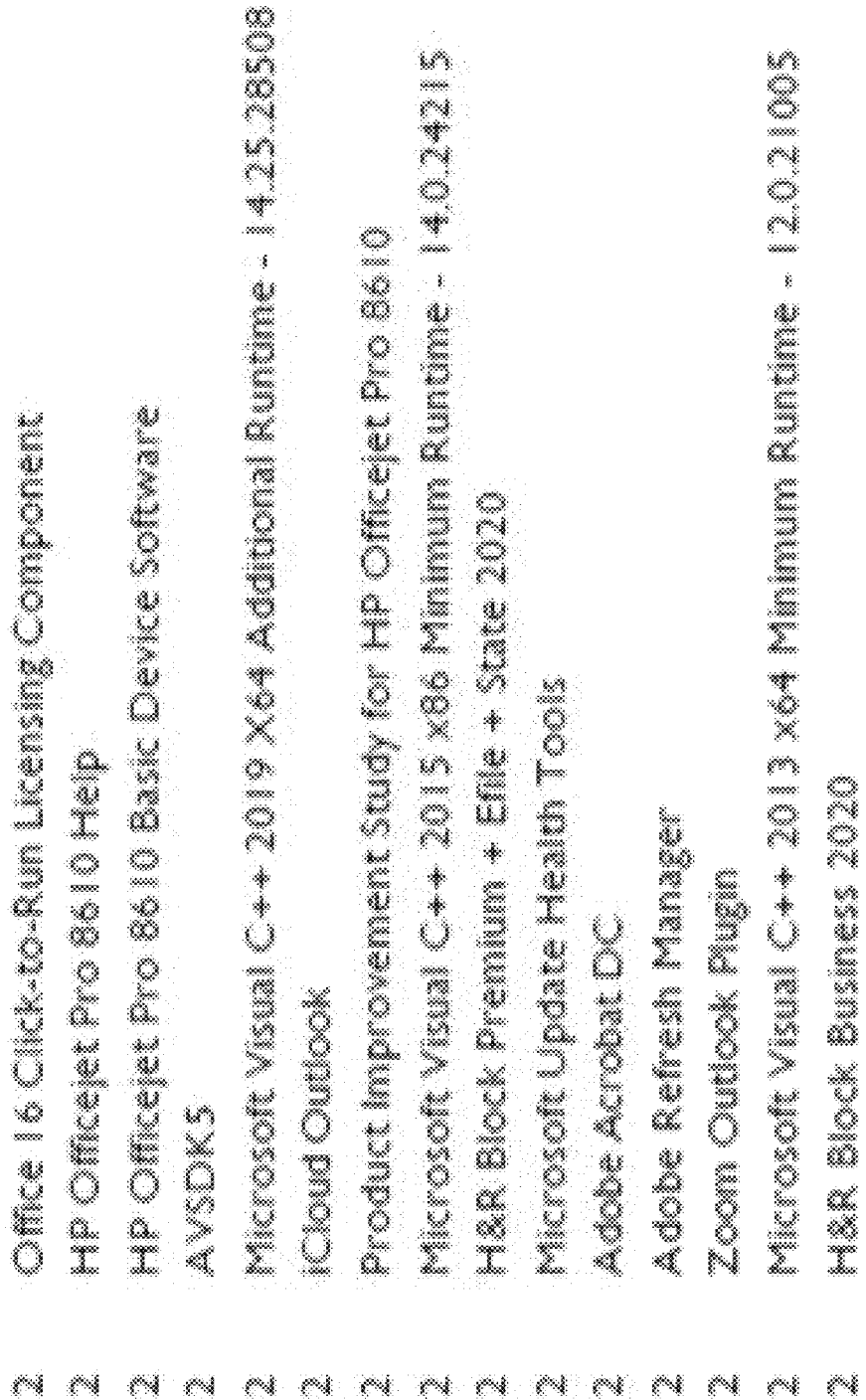

In addition to being conceptualized as a various methods 900 or information technology configurations, the system 100 can also be conceptualized as interactive subsystems. FIG. 4 is a block diagram illustrating an example of a subsystem view of the system 100.

The penetration subsystem 120 is comprised of the penetration application 310 itself. An analytics subsystem 140 is what analyzes the data uncovered by the penetration subsystem 140. A library subsystem 160 can serve as an ongoing depository of security risks and potential rules and procedures that can be recommended to mitigate those risks. A communications subsystem 180 functions to exchange information and operating instructions between the system 100 and its users 80. All four of these subsystems can implement machine learning and highly automated expert systems to enhance the ability of users 80 without any particular IT skills to best leverage the security expertise that is stored and made operational through the use of the system 100.

VI. Vulnerability Data

The system 100 can be configured to capture, analyze, communicate, and otherwise process a wide variety of different types of vulnerability data 500. This can be done in real-time as issues come up, as well as in snap-shot reports.

FIGS. 5A-5D are a collective example of a vulnerability report with respect to "Methods". Examples of the vulnerability data 500 that is displayed includes a local evaluation of the computer 200, its user's cyber hygiene or online practices, and in some instances the network around the device. Data such as computer name, username, date and time data is analyzed. This can also include an inventory of installed programs which can then subsequently be analyzed for potential security risks.

FIGS. 6A-6D are a collective example of a vulnerability report with respect to Accounts". The system 100 can identify active users without expiring passwords, and suggest or even enforce a password change policy. The vulnerability data 500 includes administrative passwords that do not expire, passwords cracked within the environment, using tools like memory abuse and ripping to obtain access to the passwords stored in memory or cache. URLs associated with the passwords can be listed. As illustrated in FIG. 6D, password reuse can be detected such that it is corrected.

FIGS. 7A-7D are a collective example of a vulnerability report with respect to an "Office" cloud service. A single user can have multiple cloud services that are subject to scrutiny by the system 100. As illustrated in FIG. 7A the system 100 can identify when multi-factor authentication is not properly enabled which makes users vulnerable to fishing attacks. As illustrated in FIG. 7B, the system 100 can also be used to identify passwords that are older than a predefined threshold of time, such as 90 days or when legacy protocols are not properly disabled. As illustrated in FIG. 7C, global administrator accounts that are easily compromised can be identified as well as specific remedial efforts suggested.

FIG. 8 is an example of a vulnerability report with respect to "Antivirus". In this example, the antivirus application on the assessed computer 220 did not produce any alerts for password cracking attempts by the penetration application 310. The identified remediation is to verify that the antivirus application is configured to detect malicious behavior like dumping NTLM hashes.

FIG. 9 is an example of a vulnerability report with respect to "Firewalls". In the example, the firewall did not block traffic containing a malicious payload. The user 80 is instructed to verify deep packet inspection is properly enabled and configured for HTTPS traffic. The system 100 can also suggest that creation and communication of specific guidelines for web browsing and internet use on work-issued devices.

FIGS. 10A-10D are a collective example of a vulnerability report with respect to "Encryption". Specific remediation suggestions are made on all four Figures.

FIG. 11 is an example of a vulnerability report with respect to "Surveillance". In the example, it does not appear that alerting is properly configured to detect an advanced persistent threat in the operating environment of the assessed computer 220.

VII. Remediation Assistance

In addition to the communication of remediation suggestions as illustrated in FIGS. 5A-11 above, the system 100 can also be implemented with a very user-friendly interface of help screens to show a user how to make the specific configuration improvements to their assessed computer 220 on a step by step basis. In some embodiments, the system 100 can even be authorized to make the desired changes in an automated manner upon receiving approval by the user 80. So instead of just telling a user to change a security related setting, the system 100 can show them visually how to do that or even make the change without any human intervention from the user 80.

The invention claimed is:

1. A computer-implemented method (900) that is initiated by a user (80) for acquiring a plurality of vulnerability data (500) for an assessed computer (220), the method (900) comprising:
    receiving (910) on a host computer (210) a penetration request (300) from the assessed computer (220);
    running (920) a penetration application (310) from the host computer (210) on the assessed computer (220); and
    collecting (930) the plurality of vulnerability data (500) from the assessed computer (220) with the penetration application (310);
    wherein said vulnerability data (500) includes a reused password (560) and a missing security tool (550).

2. The method (900) of claim 1, wherein said penetration application (310) is adapted to operate in at least one of a plurality of operating modes (110), said plurality of operating modes (110) including a snap-shot mode (112), a training mode (114), and a continuous surveillance mode (116), said method (900) further comprising enabling the user (80) to instantaneously switch from a first said operating mode (110) to a second said operating mode (110).

3. The method (900) of claim 1, said method (900) further comprising communicating to the user (80) a remediation suggestion (610) that is a step-by-step instruction showing the user (80) to make a configuration improvement on the accessed computer (220).

4. The method (900) of claim 3, said method (900) further comprising automatically implementing the step-by-step instruction without human intervention by the user (80).

5. The method (900) of claim 1, wherein said assessed computer (220) is on a network (230) that includes a plurality of assessed computers (220), and wherein said assessed computer (220) is protected by firewall (240) and said host computer (210) is outside of said firewall (240).

6. The method (900) of claim 1, wherein said plurality of vulnerability data (500) further includes a user error.

7. The method (900) of claim 1, said method (900) further comprising creating a remediation suggestion (610) automatically without human intervention that is communicated to the user (80).

8. The method (900) of claim 1, further comprising storing (940) at least a subset of said vulnerability data (500) in an encrypted vault (330).

9. The method (900) of claim 1, wherein said plurality of vulnerability data (500) includes a missing security tool (550), a personally identifiable datum (570), a network configuration (580), and a domain security policy (590).

10. The method (900) of claim 1, wherein said plurality of vulnerability data (500) includes a configuration datum.

11. The method (900) of claim 1, further comprising
   comparing (950) at least a subset of said vulnerability data (500) with an updatable security database (600) and
   invoking (960) an artificial intelligence engine (340) that uses said plurality of vulnerability data (500) and said updatable security database (600) as a plurality of inputs (610).

12. The method (900) of claim 11, further comprising updating (970) said updatable security database (600) using said plurality of inputs (610) and said artificial intelligence engine (340).

13. The method (900) of claim 11, wherein said artificial intelligence engine (340) includes an expert system engine (342) and a machine learning engine (344).

14. A computer-implemented method (900) that is initiated by a user (80) for acquiring a plurality of vulnerability data (500) for an assessed computer (220), the method (900) comprising:
   receiving (910) a penetration request (300) from the assessed computer (220) that is communicated to a host computer (210) over a network (230), wherein said network (230) is a friendly network (232);
   running (920) a penetration application (310) received from the host computer (210) and delivered to the assessed computer (220) over said friendly network (232), wherein said penetration application (310) is adapted to operate in a plurality of operating modes (110), said plurality of operating modes (110) including a snap-shot mode (112), a training mode (114), and a continuous surveillance mode (116); and
   collecting (930) the plurality of vulnerability data (500) from the assessed computer (220) with the penetration application (310);
   wherein said vulnerability data (500) includes a reused password (560) and a missing security tool (550).

15. The method (900) of claim 14, said method further comprising:
   storing (940) at least a subset of said vulnerability data (500) in an encrypted vault (330);
   comparing (950) at least a subset of said vulnerability data (500) with an updatable security database (600); and
   invoking (960) an artificial intelligence engine (340) that uses said plurality of vulnerability data (500) and said updatable security database (600) as a plurality of inputs (620).

16. The method (900) of claim 14, wherein said assessed computer (220) is protected by firewall (240) and said host computer (210) is outside of said firewall (240), wherein said assessed computer (220) is on a network (230) that includes a plurality of assessed computers (220), and wherein said plurality of vulnerability data (500) includes a plurality of accounts data (510), a plurality of antivirus data (520), a plurality of firewall data (530), a plurality of encryption data (540), and a remediation suggestion (610).

17. The method (900) of claim 16, wherein said remediation suggestion (610) includes a cracked password (612).

18. The method (900) of claim 14, wherein said vulnerability data (500) includes a vulnerability metric (590).

19. A system (100) for assessing the security of an assessed computer (220) by using a penetration application (310) communicated from a host computer (210) on a friendly network (232) across a firewall (240), said system (100) comprising:
   said host computer (210), wherein said host computer (210) includes a penetration application (310); and
   said assessed computer (220), wherein said assessed computer (210) is adapted to communicate a penetration request (300) to said host computer over said friendly network (232);
   wherein said penetration application (310) is adapted to capture and store a plurality of vulnerability data (500) pertaining to said assessed computer (220),
   wherein said vulnerability data (500) includes a reused password (560) and a missing security tool (550).

* * * * *